United States Patent
Long

(10) Patent No.: US 10,149,185 B2
(45) Date of Patent: Dec. 4, 2018

(54) REPORTING QUALITY OF EXPERIENCE OF RECEIVING DIGITAL CONTENT

(71) Applicant: Telefonaktiebolaget L M Ericsson (publ), Stockholm (SE)

(72) Inventor: Hongxia Long, Kunshan (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 404 days.

(21) Appl. No.: 14/427,482

(22) PCT Filed: Jul. 9, 2014

(86) PCT No.: PCT/SE2014/050880
§ 371 (c)(1),
(2) Date: Mar. 11, 2015

(87) PCT Pub. No.: WO2015/195020
PCT Pub. Date: Dec. 23, 2015

(65) Prior Publication Data
US 2016/0262033 A1    Sep. 8, 2016

(30) Foreign Application Priority Data

Jun. 17, 2014  (WO) ................ PCT/CN2014/080055

(51) Int. Cl.
*H04W 24/08*    (2009.01)
*H04L 12/24*    (2006.01)
(Continued)

(52) U.S. Cl.
CPC ......... *H04W 24/08* (2013.01); *H04L 41/5009* (2013.01); *H04L 43/10* (2013.01);
(Continued)

(58) Field of Classification Search
CPC ... H04W 24/08; H04W 72/005; H04W 88/02; H04W 88/04; H04W 8/20; H04L 65/4076; H04L 65/80; H04L 41/5009; H04L 43/10
(Continued)

(56) References Cited

U.S. PATENT DOCUMENTS

2006/0253601 A1* 11/2006 Vedantham ......... H04L 12/1868
709/231
2008/0215704 A1* 9/2008 Curcio .............. H04L 29/06027
709/217
(Continued)

FOREIGN PATENT DOCUMENTS

WO    03/081883 A1    10/2003
WO    2008052382 A1    5/2008

OTHER PUBLICATIONS

3GPP, "3rd Generation Partnership Project; Technical Specification Group Services and System Aspects;Multimedia Broadcast/Multicast Service (MBMS); Protocols and codecs (Release 11)," Jul. 2013, qtc.jp, http://www.qtc.jp/3GPP/Specs/26346-b20.pdf.*
(Continued)

*Primary Examiner* — Ruolei Zong
(74) *Attorney, Agent, or Firm* — Rothwell, Figg, Ernst & Manbeck, p.c.

(57) ABSTRACT

It is provided a method for reporting quality of experience of receiving digital content over a cellular network. The method is performed in a wireless terminal and comprises the steps of: detecting an end of the reception of the digital content; obtaining a device identifier of the wireless terminal; generating a reception reporting message comprising the device identifier and quality of experience metrics related to the reception of the digital content; and transmitting the reception reporting message to a network node.
(Continued)

Corresponding, wireless terminal, network node, computer programs and computer program products are also provided.

22 Claims, 7 Drawing Sheets

(51) Int. Cl.
    *H04L 12/26*     (2006.01)
    *H04W 8/20*     (2009.01)
    *H04L 29/06*     (2006.01)
    *H04W 88/02*     (2009.01)

(52) U.S. Cl.
    CPC .......... *H04L 65/4076* (2013.01); *H04L 65/80* (2013.01); *H04W 8/20* (2013.01); *H04W 88/02* (2013.01)

(58) Field of Classification Search
    USPC .......................................................... 709/224
    See application file for complete search history.

(56) References Cited

U.S. PATENT DOCUMENTS

| | | | | |
|---|---|---|---|---|
| 2011/0047287 A1* | 2/2011 | Harrang | .................. | H04L 45/00 709/235 |
| 2013/0128756 A1* | 5/2013 | Zhang | .................... | H04W 4/06 370/252 |
| 2013/0182628 A1* | 7/2013 | Gholmieh | ........... | H04L 65/4076 370/312 |
| 2014/0068030 A1 | 3/2014 | Chambers et al. | | |
| 2014/0105049 A1* | 4/2014 | Kim | ...................... | H04W 24/10 370/252 |
| 2015/0105094 A1* | 4/2015 | Kotecha | ................ | H04W 24/02 455/452.2 |

OTHER PUBLICATIONS

Wikipedia, "MMSISDN," Feb. 2014, Wikipedia.org, https://web.archive.org/web/20140228233530/https://en.wikipedia.org/wiki/MSISDN.*

3GPP TS 26.346 V12.2.0; 3GPP Standard; 3rd Generation Partnership Project; Technical Specification Group Services and System Aspects; Multimedia Broadcast/Multicast Service (MBMS); Protocols and codecs (Release 12); Publication date: Jun. 15, 2014; pp. 100-104; Chapter 9.4.

International Search Report cited in PCT/SE2014/050880, dated Mar. 16, 2015, 5 pages.

Written Opinion of the International Search Authority cited in PCT/SE2014/050880, dated Mar. 13, 2015, 9 pages.

Extended European Search Report issued in Application No. 14894961.3 dated May 18, 2017, 12 pages.

3rd Generation Partnership Project; Technical Specification Group Services and System Aspects; Multimedia Broadcast/Multicast Service (MBMS); Protocols and codecs; (Release 12), 3GPP TS 26.346 V12.2.0, Jun. 2014, 192 pages.

Gómez, G. et al.: "YouTube QoE Evaluation Tool for Android Wireless Terminals", Computing Research Repository (Corr) Journal, vol. 2014, Jun. 2, 2014, pp. 1-34.

TSG-SA4 "Device ID in Reception Reporting", 3GPP Draft; (Release 12); Meeting #80, S4-140887, Jul. 30, 2014, 4 pages.

* cited by examiner

REPORTING QUALITY OF EXPERIENCE OF RECEIVING DIGITAL CONTENT

CROSS-REFERENCE TO RELATED APPLICATION

This application is a 35 U.S.C. § 371 National Phase Entry Application from PCT/SE2014/050880, filed Jul. 9, 2014, and designating the United States, which claims priority to International application No PCT/CN2014/080055, filed Jun. 17, 2014.

TECHNICAL FIELD

The invention relates to methods, a wireless terminal, a network node, computer programs and computer program products for reporting quality of experience (QoE) of receiving digital content.

BACKGROUND

Cellular communication systems have become commonplace and are used by a large majority of people for person-to-person communication. Moreover, with the increasing use of smartphones, digitally distributed content is more and more consumed on wireless terminals. While the delivery of a large part of such content, e.g. web content, needs to be directly controllable by the user, the delivery of media content, such as video, can in many cases be shared by several users.

In order to increase efficiency of shared media consumption, point-to-multipoint systems such as broadcasting and/or multicasting can be used. In this way, network resources are shared between receiving wireless terminals to a higher degree. A set of related standards for point-to-multipoint content delivery using cellular communication systems is 3GPP MBMS (3rd Generation Partnership Project—Multimedia Broadcast Multicast Service) and 3GPP eMBMS (evolved MBMS).

Once a wireless terminal has ended receiving content, it transmits a reception report to the network. The reception report can e.g. comprise a StaR (Statistical Reporting) report and/or a RAck (Reception Acknowledgement) report. The reception report comprises quality of experience data related to the received content. When many such reports are received, statistical analysis can be performed to gain a deep understanding of the experience by the users receiving the content.

It is known for RAck and StaR reports to include a client id, e.g. an MSISDN (Mobile Subscriber Integrated Services Digital Network Number) of the wireless terminal. In this way, statistical analysis can be performed where subsequent sessions for the same subscriber can be compared.

However, it would be greatly beneficial if even greater understanding of the quality of experience for received content could be gained.

SUMMARY

It is an object to enable a better way in which to analyse quality of experience of receiving digital content.

According to a first aspect, it is provided a method for reporting quality of experience of receiving digital content over a cellular network. The method is performed in a wireless terminal and comprises the steps of: detecting an end of the reception of the digital content; obtaining a device identifier of the wireless terminal; generating a reception reporting message comprising the device identifier and quality of experience metrics related to the reception of the digital content; and transmitting the reception reporting message to a network node.

This enables analysis of digital content services (such as eMBMS) based on not only the subscriber information, but also the used device. Reporting charts can then be based on multiple dimensions, including the dimension of terminal types, which can be deduced from the device id. Moreover, problems can be identified for certain terminal types, which can reduce the customer churn by targeting services to the problematic terminal types.

The digital content may be (on-demand and/or live) streaming multimedia content.

In the step of generating a reception reporting message, the reception reporting message may comprise a reception acknowledgement message.

In the step of generating a reception reporting message, the reception acknowledgement message may comprise the device identifier.

In the step of generating a reception reporting message, the reception reporting message may comprise a statistical reporting message.

In the step of generating a reception reporting message, the statistical reporting message may comprise the device identifier.

In the step of obtaining a device identifier, the device identifier may be an International Mobile Station Equipment Identity of the wireless terminal. This is a device identifier which is often readily available in the wireless terminal.

According to a second aspect, it is provided a wireless terminal arranged to report quality of experience of receiving digital content over a cellular network. The wireless terminal comprises: a processor; and a memory storing instructions that, when executed by the processor, causes the wireless terminal to: detect an end of the reception of the digital content; obtain a device identifier of the wireless terminal; generate a reception reporting message comprising the device identifier and quality of experience metrics related to the reception of the digital content; and transmit the reception reporting message to a network node.

The digital content may be streaming multimedia content.

The instructions to generate a reception reporting message may comprise instructions that, when executed by the processor, causes the wireless terminal to generate the reception reporting message comprising a reception acknowledgement message.

The instructions to generate a reception reporting message may comprise instructions that, when executed by the processor, causes the wireless terminal to generate the reception acknowledgement message comprising the device identifier.

The instructions to generate a reception reporting message may comprise instructions that, when executed by the processor, causes the wireless terminal to generate the reception reporting message comprising a statistical reporting message.

The instructions to generate a reception reporting message may comprise instructions that, when executed by the processor, causes the wireless terminal to generate the statistical reporting message comprising the device identifier.

The instructions to obtain a device identifier may comprise instructions that, when executed by the processor, causes the wireless terminal to obtain the device identifier being an International Mobile Station Equipment Identity of the wireless terminal.

According to a third aspect, it is provided a wireless terminal comprising: means for detecting an end of reception of digital content over a cellular network; means for obtaining a device identifier of the wireless terminal; means for generating a reception reporting message comprising the device identifier and quality of experience metrics related to the reception of the digital content; and means for transmitting the reception reporting message to a network node.

According to a fourth aspect, it is provided a computer program for reporting quality of experience of receiving of digital content over a cellular network. The computer program comprises computer program code which, when run on a wireless terminal causes the wireless terminal to: detect an end of the reception of the digital content; obtain a device identifier of the wireless terminal; generate a reception reporting message comprising the device identifier and quality of experience metrics related to the reception of the digital content; and transmit the reception reporting message to a network node.

According to a fifth aspect, it is provided a computer program product comprising a computer program according to the fourth aspect and a computer readable means on which the computer program is stored.

According to a sixth aspect, it is provided a method for reporting quality of experience of a wireless terminal receiving digital content upon finishing the reception of the digital content over a cellular network. The method is performed in a network node and comprises the steps of: receiving a reception reporting message from a wireless terminal, wherein the reception reporting message comprises a user agent string, and a reception acknowledgement message or a statistical reporting message; generating a modified reception reporting message, the modified reception reporting message comprising the reception acknowledgement message or the statistical reporting message also comprising a device field based on the user agent string; and transmitting the modified reception reporting message.

The step of receiving a reception reporting message may comprise receiving the reception reporting message using Hypertext Transfer Protocol, HTTP, and wherein the user agent string is part of an HTTP header.

According to a seventh aspect, it is provided a network node arranged to reporting quality of experience of a wireless terminal receiving digital content upon finishing the reception of the digital content over a cellular network. The network node comprises: a processor; and a memory storing instructions that, when executed by the processor, causes the network node to: receive a reception reporting message from a wireless terminal, wherein the reception reporting message comprises a user agent string, and a reception acknowledgement message or a statistical reporting message; generate a modified reception reporting message, the modified reception reporting message comprising the reception acknowledgement message or the statistical reporting message also comprising a device field based on the user agent string; and transmit the modified reception reporting message.

The instructions to receive a reception reporting message may comprise instructions that, when executed by the processor, causes the network node to receive the reception reporting message using Hypertext Transfer Protocol, HTTP, and wherein the user agent string is part of an HTTP header.

According to an eighth aspect, it is provided a network node comprising: means for receiving a reception reporting message from a wireless terminal, wherein the reception reporting message comprises a user agent string, and a reception acknowledgement message or a statistical reporting message, the reception reporting message being transmitted from the wireless terminal upon finishing reception of digital content over a cellular network; means for generating a modified reception reporting message, the modified reception reporting message comprising the reception acknowledgement message or the statistical reporting message also comprising a device field based on the user agent string; and means for transmitting the modified reception reporting message.

According to a ninth aspect, it is provided a computer program for reporting quality of experience of a wireless terminal receiving digital content upon finishing the reception of the digital content over a cellular network. The computer program comprises computer program code which, when run on a wireless terminal causes the wireless terminal to: receive a reception reporting message from a wireless terminal, wherein the reception reporting message comprises a user agent string, and a reception acknowledgement message or a statistical reporting message; generate a modified reception reporting message, the modified reception reporting message comprising the reception acknowledgement message or the statistical reporting message also comprising a device field based on the user agent string; and transmit the modified reception reporting message.

According to a tenth aspect, it is provided a computer program product comprising a computer program according to the ninth aspect and a 3o computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the to accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
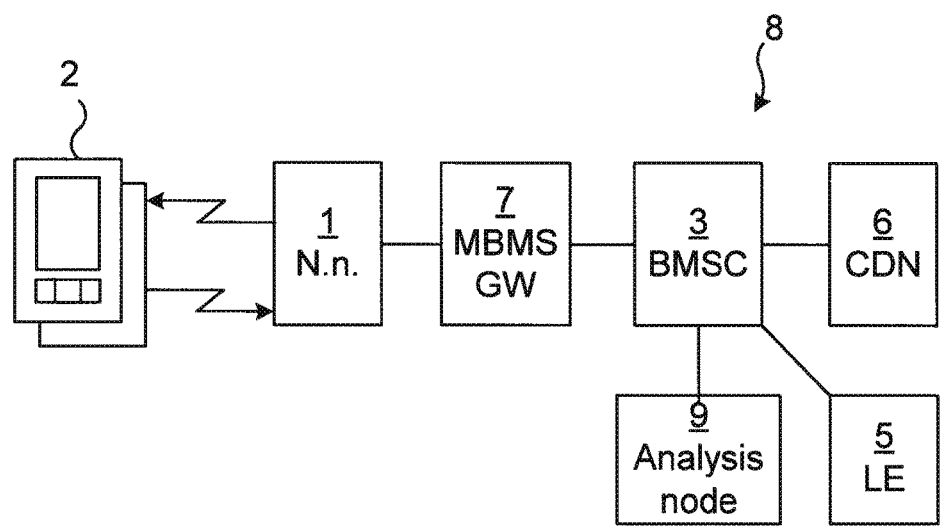
FIG. 1 is a schematic diagram illustrating a communication system where embodiments presented herein may be applied.

FIG. 1 is a schematic diagram illustrating a cellular network 8 where embodiments presented herein may be applied. The cellular network 8 comprises one or more network nodes 1, including a radio base station such as an evolved Node B, also known as eNode B or eNB. The network nodes 1 could also be in the form of a Node B, BTS (Base Transceiver Station) and/or BSS (Base Station Subsystem), etc. The network nodes 1 provide radio connectivity to a plurality of wireless terminals 2. The network nodes 1 can also comprise one or more intermediate devices such as a proxy, etc. As explained in more detail below, in one embodiment, one or more network nodes 1 are configured to modify reception reports from one or more wireless terminals to include a device field.

The wireless terminals 2 shown here are capable of receiving digital content in the form of a broadcast and/or a multicast content feed. The term wireless terminal is also known as mobile communication terminal, user equipment, wireless device, mobile terminal, user terminal, user agent, machine-to-machine device etc., and can be, for example, what today are commonly known as a mobile phone or a tablet/laptop with wireless connectivity or fixed mounted terminal. Moreover, the wireless terminals 2 can receive digital content in the form of file downloads, e.g. for software updates or downloading multimedia content to allow playback from local storage of the wireless terminals.

The cellular network 8 may e.g. comply with any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

The cellular network 8 further comprises components to support broadcast content, in a broadcast or a multicast way, i.e. multiple wireless terminals 2 can receive the same content in a point-to-multipoint fashion. This increases network efficiency, e.g. compared to point-to-point streaming, also known as unicast.

The components for broadcast can comply with any suitable standard, e.g. 3GPP MBMS (3rd Generation Partnership Project Multimedia Broadcast Multicast Service), 3GPP MBMS Evolution, 3GPP IMB (Integrated Mobile Broadcast), 3GPP eMBMS (Evolved MBMS), DVB-H (Digital Video Broadcasting—Handheld), DVB-NGH (Digital Video Broadcasting—Next Generation Handheld), or any other current or future broadcast system over wireless networks, as long as the principles described hereinafter are applicable. In this document, embodiments are presented as applied in 3GPP MBMS release 6 or later, but it is to be understood that this does not imply that any other standard is excluded.

A multimedia streaming service node 3, such as a Broadcast Multicast Service Center (BMSC) is also provided. Hereinafter, the term BMSC will be used. The BMSC 3 is responsible for the general flow of content from content providers to the wireless terminals 2.

One or more content providers, providing content through a content delivery network (CDN) 6 for on-request content are also connected to the BMSC 3. A live encoder (LE) 5 is also connected to the BMSC for live content. The live encoder 5 is responsible for encoding live content in an appropriate format and segmenting the encoded content in smaller segment files.

In this way, the wireless terminals 2 can receive broadcast and/or unicast content from the content delivery network 6 or live encoder 5. The content which is provided from the content delivery network 6 or live encoder 5 can e.g. comprise video content and/or audio content. Furthermore, the content can comprise files for download, e.g. software updates or media files for playback from local storage of the wireless terminals.

An MBMS-GW (MBMS Gateway) 7 connects the BMSC 3 with the radio access network. Moreover, the MBMS-GW 7 is responsible for session management, etc.

An analysis node 9 is also connected to the BMSC 3. Optionally, the analysis node 9 can be integrated with the BMSC 3. The analysis node 9 is used for statistical analysis of performance of content delivery. For instance, upon the wireless terminal 2 finishing receiving content, it transmits a reception report which ends up in the analysis node 9.

In order not to obscure the concepts presented herein, other (sometimes optional) network nodes such as Radio Network Controller, GGSN (Gateway GPRS (general packet radio service) support node), SGSN (serving GPRS support node), are omitted from the cellular network 8 of FIG. 1, but may be used as needed during operation. Other components not required to present the embodiments presented herein are omitted for reasons of clarity.

Figure 2:
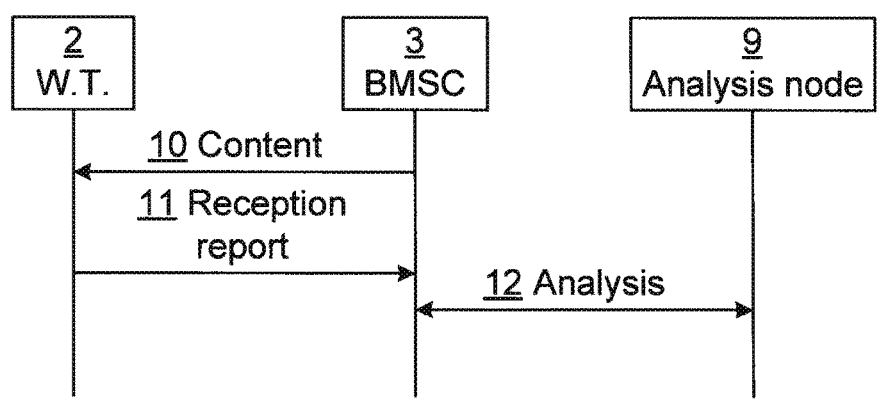
FIG. 2 is a sequence diagram illustrating reporting of quality of experience of receiving digital content.

FIG. 2 is a sequence diagram illustrating reporting of quality of experience (QoE) of receiving digital content. It is to be noted that intermediate nodes which are not required to explain the communication herein are omitted from FIG. 2.

First, content 10 is transmitted from the BMSC to the wireless terminal 2. As explained above, the content can be delivered using streaming (unicast or multicast) or file download.

Once the wireless terminal 2 ends the receiving of content 10, it transmits a reception report in a message 11 to the BMSC. Once the reception report is in the BMSC 3, it is stored (in the BMSC 3, in the analysis node 9 and/or in a separate storage node) to allow statistical analysis 12. The analysis node 9 thus performs statistical analysis over a large number of reception reports from many wireless terminals, using a plurality of dimensions.

The reception reporting is used for individual wireless terminals to report the QoE for each eMBMS session. Reception reporting is sent at the end of receiving content. The timing of the transmission can be based on an offset and random window defined in a message previously received from the BMSC 3. So although an eMBMS session may be point-to-multipoint delivering the same content to mass audiences, the reception reporting procedures could still be understood as a reverse channel for QoE reporting.

Some examples of metrics that can be included in the reception report are shown in Table 1:

TABLE 1

Example of QoE metrics

| QoE Metric | Streaming delivery method | Download delivery method | Metric type |
| --- | --- | --- | --- |
| Corruption duration metric | ✓ | | Media |
| Rebuffering duration metric | ✓ | | Session |
| Initial buffering duration metric | ✓ | | Session |
| Successive loss of RTP (Real-time Protocol) packets | ✓ | | Media |
| Frame rate deviation | ✓ | | Media |
| Jitter duration | ✓ | | Media |
| Content Access/Switch Time | ✓ | | Session |
| Network Resource | ✓ | ✓ | Session |
| Average codec bitrate | ✓ | | Media |
| Codec information | ✓ | | Media |
| Loss of Objects | | ✓ | Session |
| Distribution of Symbol Count Underrun for Failed Blocks | | ✓ | Session |

Each reception report is formatted in XML (Extensible Markup Language). There are two types of reception reports: StaR (Statistical Reporting) and RAck (Reception Acknowledgement). The reception report message 11 comprises either or both types of reception reports and may use one or more messages for this transmission.

In the prior art, it is known for RAck and StaR reports to include a client id, e.g. an MSISDN (Mobile Subscriber Integrated Services Digital Network Number) of the wireless terminal. In this way, statistical analysis can be performed where subsequent sessions for the same subscriber can be compared, which has been found to be sufficient up until now.

However, the inventors have realised that there are situations where analysis based on device id can be beneficial. From device id, terminal type can typically be deduced. The device id can be an attribute in an XML file, and may thus also be referred to as a "device id attribute".

The proposed solution enables the operator to analyse eMBMS services based on not only the subscriber information, but also the device. Reporting charts can then be based on multiple dimensions, including the dimension of terminal types. Moreover, problems can be identified for terminal types used in eMBMS services, which can reduce the customer churn by targeting services to the problematic terminal types. Also, integration with data from systems for multi-screen support and CA (Conditional Access)/DRM (Digital Rights Management) is improved since such data have a data model based on both subscriber and device.

The statistical analysis is performed in an operator analysis tool of the analysis node 9. This is based on a number of stored reception reports. The reception reports can be batch processed based on ETL (Extract-Transform-Load) to structure and aggregate data from the raw reception reports.

Operators can then perform queries on the structured data, e.g. to check whether there are some problems for a specific device type.

Alternatively or additionally, triggers can be configured based on the structured data. In this way, subscribers can be contacted and offered to update firmware and/or device configuration for device types for which issues are found.

Figure 3:
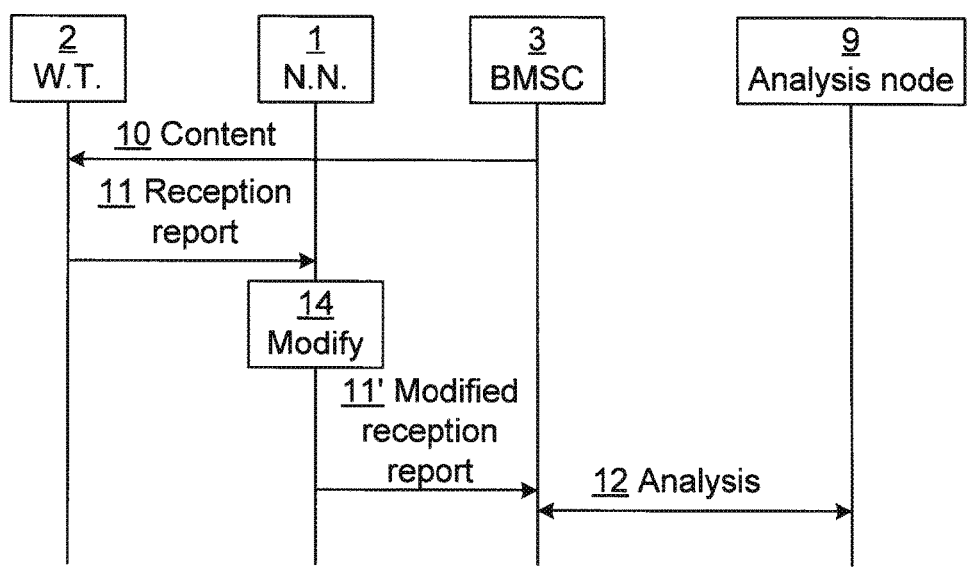
FIG. 3 is a sequence diagram illustrating reporting of quality of experience of receiving digital content where a device field is inserted by an intermediate node.

FIG. 3 is a sequence diagram illustrating reporting of quality of experience of receiving digital content according to an alternative embodiment where a device field is inserted by an intermediate node instead of or in addition to by the wireless terminal. In this embodiment, the reception report is sent by a wireless terminal to the network node 1 in a message 11 comprising a user agent string. For example, the message 11 can comply with HTTP (Hypertext Transfer Protocol), SIP (Session Initiation Protocol) or any other protocol similar to HTTP or SIP, whereby the user agent string is included in the header of the message 11. The user agent string comprises a number of device fields, allowing the identification of the type of device, such as Sony Xperia or Apple iPhone.

The network node 1 then modifies 14 the reception report, inserting a field for device type, after which the network node 1 sends a message 11' comprising the modified reception report. This modification 14 corresponds to the generate modified report step 42 of FIG. 5.

This allows the analysis node 9 to perform analysis as described above based on device type, even when a device id is not available.

Figure 4:
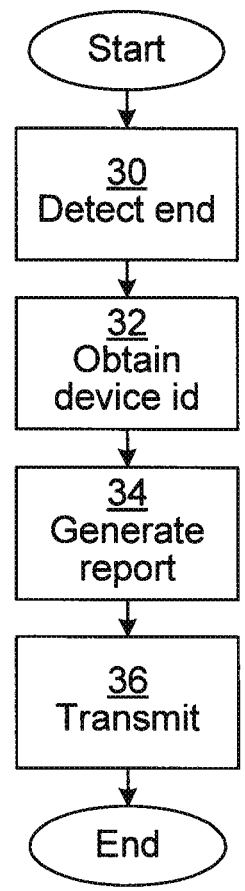
FIG. 4 is a flow chart illustrating a method performed in a wireless terminal for reporting quality of experience of receiving digital content over the cellular network of FIG. 1.

FIG. 4 is a flow chart illustrating a method for reporting QoE of receiving digital content over the cellular network of FIG. 1. The method is performed in a wireless terminal, such as the wireless terminal 2 of FIG. 1. The digital content can be any suitable content such as streaming multimedia content or downloading of a file.

In a detect end step 30, an end of an ongoing reception of the digital content is detected.

In an obtain device id step 32, a device identifier of the wireless terminal is obtained. The device id can be of any suitable format, providing an identifier which is unique, at least within the cellular network 8 for the wireless terminal 2. The device identifier can also be a globally unique identifier. For example, the device identifier can be or comprise an International Mobile Station Equipment Identity (IMEI) of the wireless terminal. It is to be noted that the device identifier is an identification of the wireless terminal, and not a subscriber using the wireless terminal. In other words, the device identifier is not a subscriber entity, such as International Mobile Subscriber Identity (IMSI) or only a Mobile Subscriber Integrated Services Digital Network Number (MSISDN) in case a user is only receiving MBMS services via one device.

In a generate report step 34, a reception reporting message is generated. The reception reporting message comprises the device identifier and QoE metrics related to the reception of the digital content.

The reception reporting message can comprise a RAck message. Optionally, the RAck message comprises the device identifier.

Alternatively or additionally, the reception reporting message comprises a StaR message. The StaR message can then comprise the device identifier.

Here below, an example of an XML schema for reception reporting for eMBMS is shown, with additions for device identifier in bold,

```
<?xml version="1.0" encoding="UTF-8"?>
<xs:schema xmlns:xs="http://www.w3.org/2001/XMLSchema"
    targetNamespace="urn:3gpp:metadata:2008:MBMS:receptionrep
ort"
    xmlns="urn:3gpp:metadata:2008:MBMS:receptionreport"
    elementFormDefault="qualified">
    <xs:element name="receptionReport"
type="receptionReportType"/>
    <xs:attribute name="clientId" type="xs:string"/>
    <xs:attribute name="deviceId" type="xs:string"/>
```

```
<xs:complexType name="receptionReportType">
    <xs:choice>
        <xs:element name="receptionAcknowledgement" type="rackType"/>
        <xs:element name="statisticalReport" type="starType"
            minOccurs="0" maxOccurs="unbounded"/ >
        <xs:any namespace="##other"
processContents="skip" minOccurs="0"
maxOccurs="unbounded"/>
    </xs:choice>
</xs:complexType>
<xs:complexType name="rackType">
    <xs:sequence>
        <xs:element name="fileURI" minOccurs="0"
maxOccurs="unbounded">
            <xs:complexType>
                <xs:simpleContent>
                    <xs:extension base="fileUriType">
                        <xs:attribute ref="clientId"
use="optional"/>
                        <xs:attribute ref="deviceId"
use="optional"/>
                    </xs:extension>
                </xs:simpleContent>
            </xs:complexType>
        </xs:element>
    </xs:sequence>
</xs:complexType>
<xs:complexType name="starType">
    <xs:sequence>
        <xs:element name="fileURI" type="fileUriType"
minOccurs="0" maxOccurs="unbounded"/>
        <xs:element name="qoeMetrics"
type="qoeMetricsType" minOccurs="0" maxOccurs="1"/>
        <xs:any namespace="##other"
processContents="skip" minOccurs="0"
maxOccurs="unbounded"/>
    </xs:sequence>
    <xs:attribute name="sessionType"
type="sessionTypeType" use="optional"/>
        <xs:attribute name="serviceId" type="xs:string"
use="optional"/>
        <xs:attribute ref="clientId" use="optional"/>
        <xs:attribute ref="deviceId" use="optional"/>
        <xs:attribute name="serviceURI" type="xs:anyURI"
use="optional"/>
        <xs:anyAttribute processContents="skip"/>
</xs:complexType>
<xs:simpleType name="sessionTypeType">
    <xs:restriction base="xs:string">
        <xs:enumeration value="download"/>
        <xs:enumeration value="streaming"/>
    </xs:restriction>
</xs:simpleType>
<xs:complexType name="fileUriType">
    <xs:simpleContent>
        <xs:extension base="xs:anyURI">
            <xs:attribute name="receptionSuccess"
type="xs:boolean" use="optional" default="true"/>
            <xs:attribute name="Content-MD5"
type="xs:base64Binary" use="optional"/>
            <xs:attribute
name="receivedSymbolsForFailedBlocks"
type="unsignedLongVectorType" use="optional"/>
            <xs:attribute name="totalSymbolsForFailedBlocks"
type="unsignedLongVectorType" use="optional"/>
            <xs:anyAttribute processContents="skip"/>
        </xs:extension>
    </xs:simpleContent>
</xs:complexType>
<xs:complexType name="qoeMetricsType">
    <xs:sequence>
        <xs:element name="medialevel_qoeMetrics"
type="medialevel_qoeMetricsType"
            minOccurs="0" maxOccurs="unbounded"/>
        <xs:any namespace="##other"
processContents="skip" minOccurs="0"
maxOccurs="unbounded"/>
    </xs:sequence>
    <xs:attribute name="totalRebufferingDuration"
type="doubleVectorType" use="optional"/>
    <xs:attribute name="numberOfRebufferingEvents"
type="unsignedLongVectorType"
        use="optional"/>
    <xs:attribute name="initialBufferingDuration"
type="xs:double" use="optional"/>
    <xs:attribute name="contentAccessTime"
type="xs:double" use="optional"/>
    <xs:attribute name="sessionStartTime"
type="xs:unsignedLong"/>
    <xs:attribute name="sessionStopTime"
type="xs:unsignedLong"/>
    <xs:attribute name="networkResourceCellId"
type="stringVectorType" use="optional"/>
    <xs:attribute name="numberOfLostObjects"
type="unsignedLongVectorType"
        use="optional"/>
    <xs:attribute name="symbolCountUnderrun"
type="stringVectorType" use="optional"/>
    <xs:attribute name="numberOfReceivedObjects"
type="unsignedLongVectorType"
        use="optional"/>
    <xs:anyAttribute processContents="skip"/>
</xs:complexType>
<xs:complexType name="medialevel_qoeMetricsType">
    <xs:attribute name="sessionId" type="xs:string"/>
    <xs:attribute name="totalCorruptionDuration"
type="unsignedLongVectorType"
        use="optional"/>
    <xs:attribute name="numberOfCorruptionEvents"
type="unsignedLongVectorType"
        use="optional"/>
    <xs:attribute name="t" type="xs:boolean"
use="optional"/>
    <xs:attribute name="totalNumberofSuccessivePacketLoss"
type="unsignedLongVectorType"
        use="optional"/>
    <xs:attribute name="numberOfSuccessiveLossEvents"
type="unsignedLongVectorType"
        use="optional"/>
    <xs:attribute name="numberOfReceivedPackets"
type="unsignedLongVectorType"
        use="optional"/>
    <xs:attribute name="framerateDeviation"
type="doubleVectorType" use="optional"/>
    <xs:attribute name="totalJitterDuration"
type="doubleVectorType" use="optional"/>
    <xs:attribute name="numberOfJitterEvents"
type="unsignedLongVectorType" use="optional"/>
    <xs:attribute name="framerate" type="doubleVectorType"
use="optional"/>
    <xs:attribute name="codecInfo" type="stringVectorType"
use="optional"/>
    <xs:attribute name="codecProfileLevel"
type="stringVectorType" use="optional"/>
    <xs:attribute name="codecImageSize"
type="stringVectorType" use="optional"/>
    <xs:attribute name="averageCodecBitrate"
type="doubleVectorType" use="optional"/>
    <xs:anyAttribute processContents="skip"/>
</xs:complexType>
<xs:simpleType name="doubleVectorType">
    <xs:list itemType="xs:double"/>
</xs:simpleType>
<xs:simpleType name="unsignedLongVectorType">
    <xs:list itemType="xs:unsignedLong"/>
</xs:simpleType>
<xs:simpleType name="stringVectorType">
    <xs:list itemType="xs:string"/>
</xs:simpleType>
</xs:schema>
```

In this way, the device identifier is included within the RAck reception report and/or StaR report for convenient inclusion of the device identifier field in statistical analysis, i.e. the clientId attribute of the statistical analysis will also comprise information for enabling identification of the device used by the subscriber. Furthermore, the device identifier can optionally be included in the level above the RAck/StaR report, i.e. the level entitled "receptionReport". Optionally the device identifier can be combined with the subscriber identity and used as a value of the "clientId" attribute field in order to make the clientId unique to the UE as the receiver of delivered digital content and also keep the possibility for analysis node 9 to extract the device identifier and derive device attributes (e.g. device type) of the used device from the device identifier. In the latter case, the device identifier is extractable from a well defined "clientId" format, which e.g. may be arranged as two values separated by a comma within the clientId string (e.g. MSISDN and IMEI of the UE).

In a transmit step 36, the reception reporting message is transmitted to a network node, for delivery to the BMSC.

Figure 5:
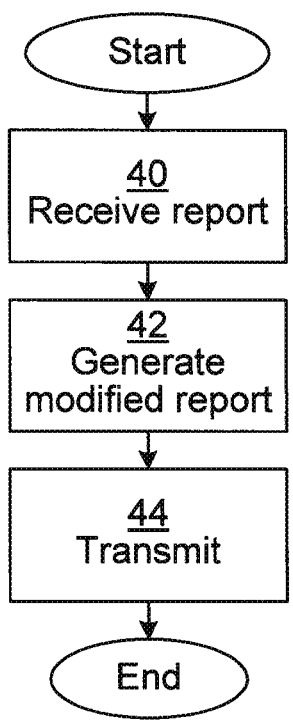
FIG. 5 is a flow chart illustrating a method performed in a network node for reporting quality of experience of receiving digital content over the cellular network of FIG. 1.

FIG. 5 is a flow chart illustrating a method performed in a network node for reporting QoE of receiving digital content over the cellular network of FIG. 1, as an alternative or in addition to the method described above with reference to FIG. 4. The method corresponds to the sequence diagram of FIG. 3, relating to the role of the network node 1.

In a receive report step 40, a reception reporting message is received from a wireless terminal, wherein the reception reporting message comprises a user agent string, and a RAck message or a StaR message.

The reception reporting message can e.g. be received using Hypertext Transfer Protocol, HTTP, in which case the user agent string is part of an HTTP header of the received message.

In a generate modified report step 42, a modified reception reporting message is generated. The modified reception reporting message comprises the RAck message or the StaR message also comprising a device field based on the user agent string In a transmit step 44, the modified reception reporting message is transmitted, e.g. to the BMSC, or any other network node capable of recognizing and processing the mentioned report.

Figure 6:
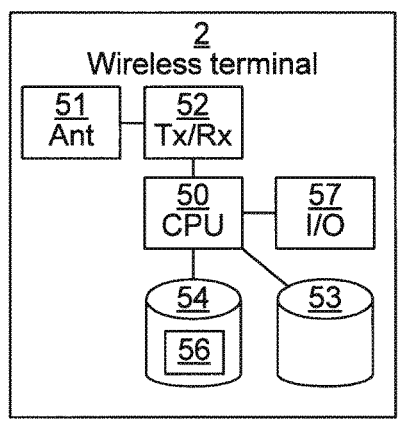
FIG. 6 is a schematic diagram showing some components of the wireless terminal of FIG. 1.

FIG. 6 is a schematic diagram showing some components of the wireless terminal 2 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54. The memory 54 can thus be considered to be a computer program product. The processor 50 can be configured to execute the method described with reference to FIG. 4 above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM) and may also comprise persistent storage, which, for example, can be any single one or combination of magnetic memory, optical memory, solid state memory or even remotely mounted memory.

The wireless terminal 2 further comprises an I/O interface 57 for communicating with other external entities. The I/O interface 57 also includes a user interface (not shown).

The wireless terminal 2 also comprises one or more transceivers 52 comprising analogue and digital components, and a suitable number of antennas 51 for wireless communication with the network as shown in FIG. 1.

Other components of the wireless terminal 2 are omitted in order not to obscure the concepts presented herein.

Figure 7:
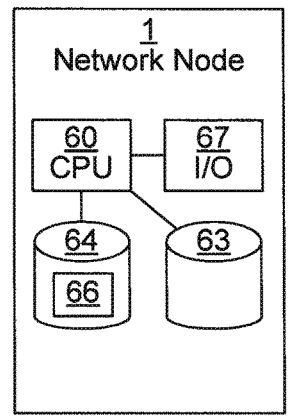
FIG. 7 is a schematic diagram showing some components of the network node of FIG. 1.

FIG. 7 is a schematic diagram showing some components of the network node 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64. The memory 64 can thus be considered to be a computer program product. The processor 60 can be configured to execute the method described with reference to FIG. 5 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM) and may also comprise persistent storage, which, for example, can be any single one or combination of magnetic memory, optical memory, solid state memory or even remotely mounted memory.

The network node 1 further comprises an I/O interface 67 for communicating with other external entities, e.g. the BMSC 3 and the wireless terminals 2. Optionally, the I/O interface 62 also includes a user interface (not shown).

Other components of the network node 1 are omitted in order not to obscure the concepts presented herein.

Figure 8:
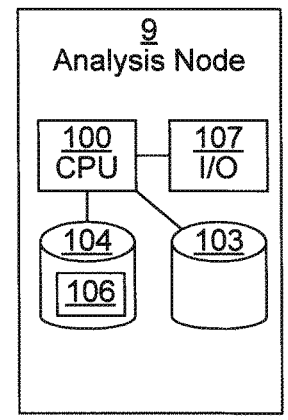
FIG. 8 is a schematic diagram showing some components of the analysis node of FIG. 1.

FIG. 8 is a schematic diagram showing some components of the analysis node 9 of FIG. 1. A processor 100 is provided using any combination of one or more of a suitable central processing unit (CPU), multiprocessor, microcontroller, digital signal processor (DSP), application specific integrated circuit etc., capable of executing software instructions 106 stored in a memory 104. The memory 104 can thus be considered to be a computer program product.

The memory 104 can be any combination of read and write memory (RAM) and read only memory (ROM). The memory 104 also comprises persistent storage, which, for example, can be any single one or combination of magnetic memory, optical memory, solid state memory or even remotely mounted memory.

A data memory 103 is also provided for reading and/or storing data during execution of software instructions in the processor 100. The data memory 103 can be any combination of read and write memory (RAM) and read only memory (ROM) and may also comprise persistent storage, which, for example, can be any single one or combination of magnetic memory, optical memory, solid state memory or even remotely mounted memory.

The analysis node 9 further comprises an I/O interface 107 for communicating with other external entities, e.g. the BMSC 3. Optionally, the I/O interface 102 also includes a user interface (not shown).

Other components of the analysis node 9 are omitted in order not to obscure the concepts presented herein.

Figure 9:
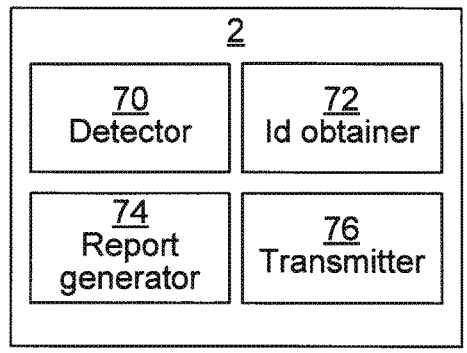
FIG. 9 is a schematic diagram showing functional modules of the wireless terminal of FIGS. 1 and 6.

FIG. 9 is a schematic diagram showing functional modules of the wireless terminal 2 of FIGS. 1 and 6. The modules can be implemented using software instructions such as a computer program executing in the wireless terminal 2. The modules correspond to the steps in the method illustrated in FIG. 4. Alternatively, all of the modules may be arranged as hardware modules, or the wireless terminal may comprise a combination of software and hardware modules.

A detector 70 is arranged to detect an end of the reception of the digital content. This module corresponds to the detect end step 30 of FIG. 4.

An id obtainer 72 is arranged to obtain a device identifier of the wireless terminal. This module corresponds to the obtain device id step 32 of FIG. 4.

A report generator 74 is arranged to generate a reception reporting message comprising the device identifier and QoE metrics related to the reception of the digital content. This module corresponds to the generate report step 34 of FIG. 4.

A transmitter 76 is arranged to transmit the reception reporting message to a network node. This module corresponds to the transmit step 36 of FIG. 4.

Figure 10:
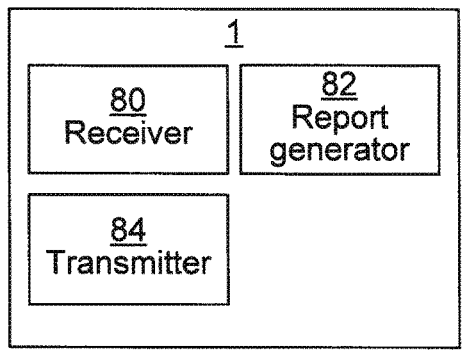
FIG. 10 is a schematic diagram showing functional modules of the network node of FIGS. 1 and 7.

FIG. 10 is a schematic diagram showing functional modules of the network node 1 of FIGS. 1 and 7. The modules can be implemented using software instructions such as a computer program executing in the network node 1. The modules correspond to the steps in the method illustrated in FIG. 5.

Alternatively, all of the modules may be arranged as hardware modules, or the wireless terminal may comprise a combination of software and hardware modules.

A receiver 80 is arranged to receive a reception reporting message from a wireless terminal. The reception reporting message here comprises a user agent string, and a RAck message and/or a StaR message. This module corresponds to the receive report step 40 of FIG. 5.

A report generator 82 is arranged to generate a modified reception reporting message. The modified reception reporting message comprises the RAck message or the StaR message, but also a device field based on the user agent string. This module corresponds to the generate modified report step 42 of FIG. 5.

A transmitter 84 is arranged to transmit the modified reception reporting message. This module corresponds to the transmit step 44 of FIG. 5.

Figure 11:
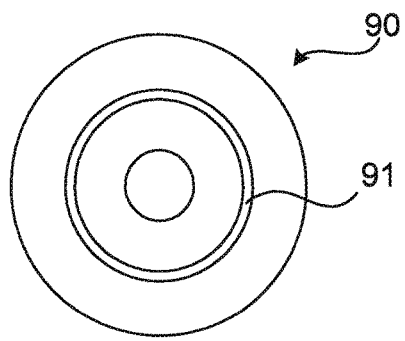
FIG. 11 shows one example of a computer program product comprising computer readable means.

FIG. 11 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 6, the computer program product 66 of FIG. 7 or the computer program product 106 of FIG. 8, or as a removable solid state memory, e.g. a flash storage memory (such as a Universal Serial Bus (USB) drive). While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for reporting quality of experience of receiving digital content over a cellular network, the method being performed in a wireless terminal and comprising the steps of:
receiving a message transmitted by a network node, the message comprising timing information;
determining, based on the received timing information, one of: i) a time and ii) a time window;
detecting an end of the reception of the digital content;
obtaining a first device identifier of the wireless terminal;
obtaining a second device identifier of the wireless terminal;
generating a reception reporting message comprising the first device identifier of the wireless terminal and the second device identifier of the wireless terminal, the reception reporting message further comprising quality of experience (QoE) metrics related to the reception of the digital content; and
as a result of detecting the end of the reception of the digital content, transmitting the reception reporting message to the network node at said determined time or within said determined time window, wherein
the first device identifier of the wireless terminal identifies a subscriber or a subscription,
the second device identifier of the wireless terminal does not identify any subscriber or subscription, and
the second device identifier of the wireless terminal is not an IMSI or MSISDN.

2. The method according to claim 1, wherein the digital content is streaming multimedia content.

3. The method according to claim 1, wherein the reception reporting message comprises a reception acknowledgement (RAck) report.

4. The method according to claim 3, wherein the RAck report comprises the first device identifier, the second device identifier, and the QoE metrics.

5. The method according to claim 1, wherein the reception reporting message comprises a statistical reporting (StaR) report.

6. The method according to claim 5, wherein the StaR report comprises the first device identifier, the second device identifier, and the QoE metrics.

7. The method according to claim 1, wherein
the first device identifier is one of an IMSI and MSISDN of the wireless terminal, and
the second device identifier comprises an International Mobile Equipment Identity (IMEI) of the wireless terminal.

8. A wireless terminal arranged to report quality of experience of receiving digital content over a cellular network, the wireless terminal comprising:
a processor; and
a memory storing instructions that, when executed by the processor, causes the wireless terminal to:
determine one of: i) a time and ii) a time window, wherein the determining is based on timing information included in a received message, wherein the message was transmitted by a network node;
detect an end of the reception of the digital content;
obtain a first device identifier of the wireless terminal;
obtain a second device identifier of the wireless terminal;
generate a reception reporting message comprising the first device identifier of the wireless terminal and the second device identifier of the wireless terminal, the reception reporting message further comprising quality of experience (QoE) metrics related to the reception of the digital content; and as a result of detecting the end of the reception of the digital content, transmit the reception reporting message to the network node at said determined time or within said determined time window, wherein the first device identifier of the wireless terminal identifies a subscriber or a subscription, the second device identifier of the wireless terminal does not identify any subscriber or subscription, and the second device identifier of the wireless terminal is not an IMSI or MSISDN.

9. The wireless terminal according to claim 8, wherein the digital content is streaming multimedia content.

10. The wireless terminal according to claim 8, wherein the reception reporting message comprises a reception acknowledgement (RAck) report.

11. The wireless terminal according to claim 10, wherein the RAck report comprises the first device identifier, the second device identifier, and the QoE metrics.

12. The wireless terminal according to claim 8, wherein the reception reporting message comprises a statistical reporting (StaR) report.

13. The wireless terminal according to claim 12, wherein the StaR report comprises the first device identifier, the second device identifier, and the QoE metrics.

14. The wireless terminal according to claim 8, wherein the first device identifier is one of an IMSI and MSISDN of the wireless terminal, and the second device identifier comprises an International Mobile Equipment Identity (IMEI) of the wireless terminal.

15. A wireless terminal, comprising:

a transmitter; and a processor coupled to the transmitter, the processor being configured to:

determine one of: i) a time and ii) a time window, wherein the determining is based on timing information included in a received message, wherein the message was transmitted by a network node;

detect an end of reception of digital content over a cellular network;

obtain a first device identifier of the wireless terminal;

obtain a second device identifier of the wireless terminal;

generate a reception reporting message comprising the first device identifier of the wireless terminal and the second device identifier of the wireless terminal, the reception reporting message further comprising quality of experience (QoE) metrics related to the reception of the digital content; and as a result of detecting the end of the reception of the digital content, employ the transmitter to transmit the reception reporting message to the network node at said determined time or within said determined time window, wherein the first device identifier of the wireless terminal identifies a subscriber or a subscription, the second device identifier does not identify any subscriber or subscription, and the second device identifier is not an IMSI or MSISDN.

16. A computer program product comprising a non-transitory computer readable medium storing a computer program for reporting quality of experience of receiving of digital content over a cellular network, the computer program comprising computer program code which, when run on a wireless terminal causes the wireless terminal to:

determine one of: i) a time and ii) a time window, wherein the determining is based on timing information included in a received message, wherein the message was transmitted by a network node;

detect an end of the reception of the digital content;

obtain a first device identifier of the wireless terminal;

obtain a second device identifier of the wireless terminal;

generate a reception reporting message comprising the first device identifier of the wireless terminal and the second device identifier of the wireless terminal, the reception reporting message further comprising quality of experience (QoE) metrics related to the reception of the digital content; and as a result of detecting the end of the reception of the digital content, transmit the reception reporting message to the network node at said determined time or within said determined time window, wherein the first device identifier of the wireless terminal identifies a subscriber or a subscription, the second device identifier does not identify any subscriber or subscription, and the second device identifier is not an IMSI or MSISDN.

17. A method for reporting quality of experience (QoE) of a wireless terminal receiving digital content upon finishing the reception of the digital content over a cellular network, the method being performed in a network node and comprising the steps of:

receiving a message transmitted by the wireless terminal, the message comprising i) a message header comprising a user agent string comprising device type information and ii) a message body comprising a reception report comprising quality of experience (QoE) information and a first device identifier of the wireless terminal;

determining a second device identifier of the wireless terminal based on the device type information included in the user agent string;

generating a modified reception report that comprises the first device identifier of the wireless terminal, the second device identifier of the wireless terminal, and the QoE information, wherein the generating the modified reception report comprises adding to the received reception report the second device identifier of the wireless terminal; and transmitting the modified reception report comprising the first device identifier of the wireless terminal, the second device identifier of the wireless terminal, and the QoE information.

18. The method according to claim 17, wherein the message is one of: i) a Hypertext Transfer Protocol message and ii) a Session Initiation Protocol message, the first device identifier of the wireless terminal identifies a subscriber or a subscription, the second device identifier of the wireless terminal does not identify any subscriber or subscription, and the second device identifier of the wireless terminal is not an IMSI or MSISDN.

19. A network node arranged to reporting quality of experience of a wireless terminal receiving digital content upon finishing the reception of the digital content over a cellular network, the network node comprising:

a processor; and a memory storing instructions that, when executed by the processor, causes the network node to:

process a received message that was transmitted by the wireless terminal, the message comprising i) a message header comprising a user agent string comprising device type information and ii) a message body comprising a reception report comprising quality of experience (QoE) information and a first device identifier of the wireless terminal;

determine a second device identifier of the wireless terminal based on the device type information included in the user agent string;

generate a modified reception report that comprises the first device identifier of the wireless terminal, the second device identifier of the wireless terminal, and the QoE information, wherein the generating the modified reception report comprises adding to the received reception report the second device identifier of the wireless terminal; and transmit the modified reception report comprising the first device identifier of the wireless terminal, the second device identifier of the wireless terminal, and the QoE information.

20. The network node according to claim 19, wherein the received message is one of: i) a Hypertext Transfer Protocol message and ii) a Session Initiation Protocol message.

21. A network node comprising:

a transmitter;

a receiver for receiving a message transmitted by a wireless terminal, the message comprising i) a message header comprising a user agent string comprising device type information and ii) a message body comprising a reception report comprising quality of experience (QoE) information and a first device identifier of the wireless terminal; and a processor coupled to the transmitter and the receiver, the processor being configured to:

i) determine a second device identifier of the wireless terminal based on the device type information included in the user agent string, ii) generate a modified reception report that comprises the first device identifier of the wireless terminal, the second device identifier of the wireless terminal, and the QoE information, wherein the generating the modified reception report comprises adding to the received reception report the second device identifier of the wireless terminal; and iii) employ the transmitter to transmit the modified reception report comprising the first device identifier of the wireless terminal, the second device identifier of the wireless terminal, and the QoE information.

22. A computer program product comprising a non-transitory computer readable medium storing a computer program for reporting quality of experience of a wireless terminal receiving digital content upon finishing the reception of the digital content over a cellular network, the computer program comprising computer program code which, when run on a network node causes the network node to:

process a received message that was transmitted by the wireless terminal, the message comprising i) a message header comprising a user agent string comprising device type information and ii) a message body comprising a reception report comprising quality of experience (QoE) information and a first device identifier of the wireless terminal;

determine a second device identifier of the wireless terminal based on the device type information included in the user agent string;

generate a modified reception report that comprises the first device identifier of the wireless terminal, the second device identifier of the wireless terminal, and the QoE information, wherein the generating the modified reception report comprises adding to the received reception report the second device identifier of the wireless terminal; and transmit the modified reception report comprising the first device identifier of the wireless terminal, the second device identifier of the wireless terminal, and the QoE information.

* * * * *

UNITED STATES PATENT AND TRADEMARK OFFICE
CERTIFICATE OF CORRECTION

PATENT NO. : 10,149,185 B2
APPLICATION NO. : 14/427482
DATED : December 4, 2018
INVENTOR(S) : Hongxia Long It is certified that error appears in the above-identified patent and that said Letters Patent is hereby corrected as shown below:

On the Title Page

On Page 2, in Item (56), under "OTHER PUBLICATIONS", in Column 2, Line 1, delete ""MMSISDN,"" and insert -- "MSISDN," --, therefor.

In the Specification

In Column 1, Line 10, delete "No" and insert -- No. --, therefor.

In Column 4, Line 26, delete "a 3o computer" and insert -- a computer --, therefor.

In Column 4, Line 42, delete "to the to" and insert -- to the --, therefor.

In Column 5, Line 46, delete "Multiplex)," and insert -- Multiple Access), --, therefor.

In Column 8, Line 35, delete "Mobile Station" and insert -- Mobile --, therefor.

In Column 8, Line 56, delete "bold," and insert -- bold. --, therefor.

In Column 11, Line 36, delete "string" and insert -- string. --, therefor.

In Column 11, Lines 51-52, delete "read and write memory (RAM)" and insert -- read and write memory (RWM) --, therefor.

In Column 11, Line 60, delete "read and write memory (RAM)" and insert -- read and write memory (RWM) --, therefor.

In Column 12, Lines 17-18, delete "read and write memory (RAM)" and insert -- read and write memory (RWM) --, therefor.

Signed and Sealed this
Twenty-sixth Day of March, 2019

Andrei Iancu
*Director of the United States Patent and Trademark Office*

CERTIFICATE OF CORRECTION (continued)
U.S. Pat. No. 10,149,185 B2

In Column 12, Line 26, delete "read and write memory (RAM)" and insert -- read and write memory (RWM) --, therefor.

In Column 12, Lines 45-46, delete "read and write memory (RAM)" and insert -- read and write memory (RWM) --, therefor.

In Column 12, Line 54, delete "read and write memory (RAM)" and insert -- read and write memory (RWM) --, therefor.